UNITED STATES PATENT OFFICE.

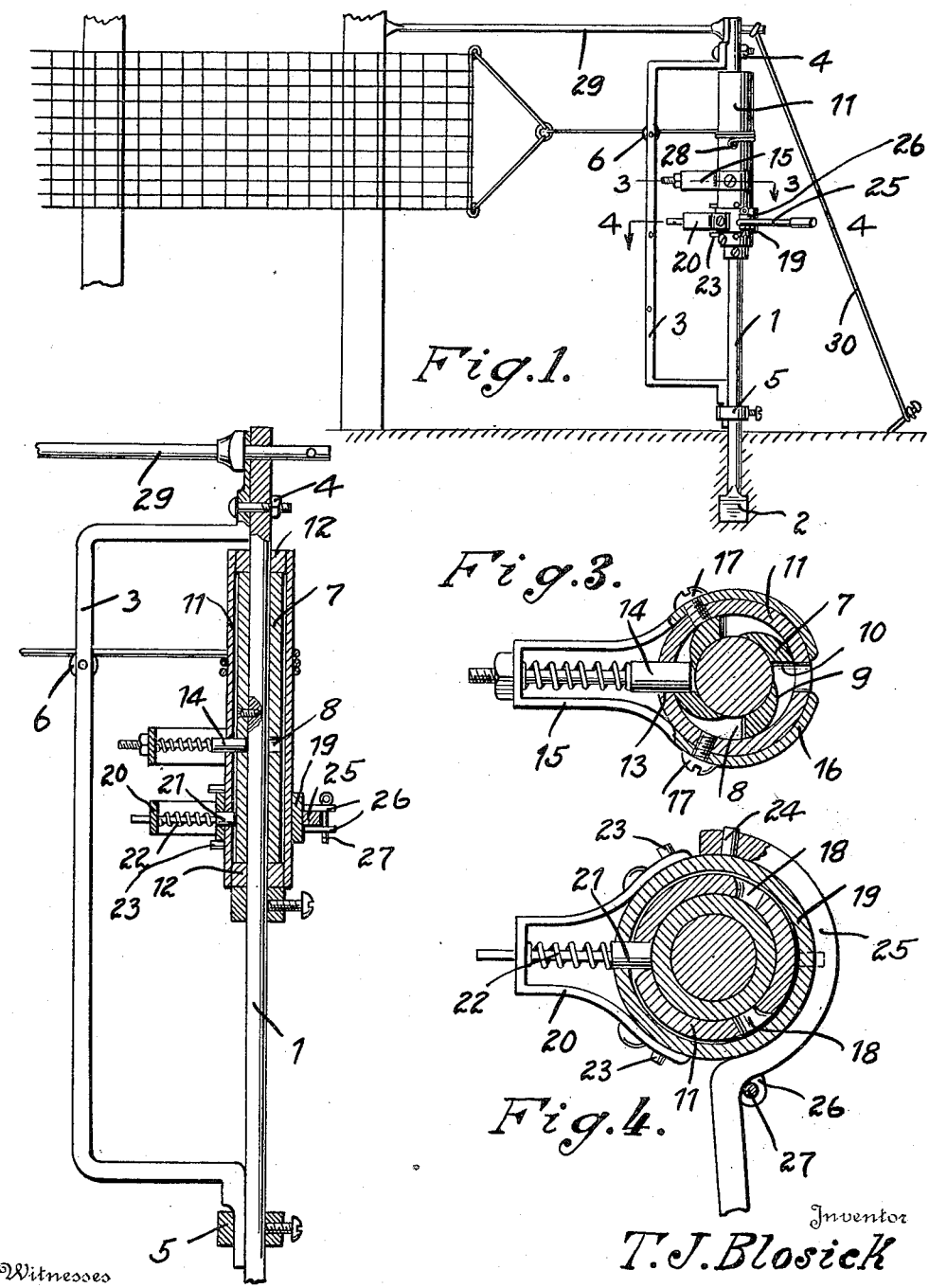

THOMAS J. BLOSICK, OF SHANIKO, OREGON.

WIRE-STRETCHER.

1,130,704. Specification of Letters Patent. Patented Mar. 9, 1915.

Application filed June 18, 1914. Serial No. 845,953.

*To all whom it may concern:*

Be it known that I, THOMAS J. BLOSICK, a citizen of the United States, residing at Shaniko, in the county of Wasco, State of Oregon, have invented certain new and useful Improvements in Wire-Stretchers; and I do hereby declare the following to be a full, clear, and exact description of the invention, such as will enable others skilled in the art to which it appertains to make and use the same.

This invention relates to a wire stretcher. An object of the invention is to provide a device of this character which will facilitate the stretching of wires on fences or the like.

With this and other objects in view, such as appear as the description progresses, my invention comprises the combination and arrangement of parts as herein set forth and subsequently claimed.

Referring to the drawing: Figure 1 is a side elevation of my device in operative position. Fig. 2 is a longitudinal section thereof. Fig. 3 is a section on line 3—3 of Fig. 1. Fig. 4 is a section on line 4—4 of Fig. 1.

Referring to the drawing by reference characters wherein like parts are indicated by like characters throughout the several views: My device comprises a vertically extending post 1 having a flattened chisel-shaped end to facilitate the driving of the post into the ground. A U-shaped member 3 is secured to the post at the upper and lower ends thereof, at the upper end by a bolt 4 and at the lower end by a collar 5. On the bight portion of this U-shaped member is a roller 6.

A sleeve 7 is rigidly secured to the post between the legs of the U-shaped member and has a plurality of holes 8 formed therein. A cam surface 9 leading to each of the holes from one direction and an abrupt shoulder 10 being on the other side of each of the holes.

A sleeve 11 is rotatably mounted on the post 1 and incloses the sleeve 7. Secured to each end of this sleeve 11 is a collar 12 which contacts with the adjacent end of the sleeve 7 to limit the longitudinal movement of the sleeve 11 with respect thereto. An aperture 13 is formed in the face of the sleeve 11 and in alinement with the holes 8 in the sleeve 7. A spring pressed bolt 14 is mounted in a bracket 15 and extends through the aperture 13 in the sleeve 11 so as to engage one of the holes 8 in the sleeve 7. A collar 16 is secured to the sleeve 11 by screws 17. The bolt 14 is pushed into engagement with one of the holes 8 in the sleeve 7 and maintains the sleeves 7 and 11 against relative movement in one direction, but because of the cam faces 9 the relative movement of the said sleeves is permitted in the other direction, the end of the bolt 14 riding from one hole 8 to the other. In order that the sleeve 11 may be rotated, I have provided the same with a plurality of holes 18 and encircling the sleeve about these holes is a collar 19 having a bracket 20 thereon in which is mounted a bolt 21 which is spring pressed by means of a coil spring 22 so that the end of the said bolt will snap into one of the holes 18 in the sleeve 11 during the operation of the device. It is to be understood that the rear edge of each of these holes 18 is beveled so as to allow the end of the bolt to pass out of the hole when the collar 19 is rotated in one direction. This collar is prevented from longitudinal movement on the sleeve 11 by a plurality of pins 23 secured to the said sleeve along each edge of the collar. Detachably secured to the collar on a pin 24 is an operating handle 25 which passes through two parallel ears 26 and is held therein by a cotter pin 27. The bolt 14 is screw threaded on the end and has a nut bearing against the outer face of the bracket 15 so that the bolt 14 may be withdrawn from the holes 8 in the sleeve 7 and maintained in such position to allow the return movement of the sleeve 11. A lug 28 is formed on the sleeve 11 adjacent the upper end thereof by means of which a wire may be secured to the sleeve 11. It is to be understood that while I have merely described the construction of one of these operating devices mounted on the post 1 a number of the same may be mounted thereon where it is desirable to stretch several pieces of wire.

Secured in the upper end of the post 1 is a brace 29 which extends at right angles therefrom and is arranged to bear against the adjacent fence post. The device is further braced by a wire 30 which is attached to the rear end of this brace 29 and to a peg driven in the ground.

In operation the post 1 is driven into the ground and the brace 29 and the wire 30 secured in place. The wire which is to be stretched is secured to the lug 28 after passing over one of the rollers 6, the arm 25 is then grasped and the sleeve 11 is turned to wind the wire thereon. Because of the member 3 the operating arm 25 cannot complete a revolution, therefore it is necessary to return the arm to its initial position for a new grip on the sleeve 11 and during this movement the sleeve is prevented from rotation by the end of the bolt 14 engaging a hole 8 in the sleeve 7. This operation is continued until the wire is stretched to the desired point.

From the foregoing description it may be seen that I have provided a device which will greatly facilitate the stretching of wire in constructing a fence, and I have further provided means on the said device which will maintain the wire in its stretched condition during the movement of the operating device to get a new grip on the winding drum.

While I have shown a particular embodiment of my invention it is to be understood that I do not wish to be limited to that particular embodiment as numerous changes may be made within scope of the invention as defined by the claim.

What is claimed is:—

A device of the class described comprising a post, a sleeve secured thereto, said sleeve having a plurality of holes therein, one edge of each hole being abrupt and the other edge inclined, a second sleeve revolubly mounted on and inclosing the first sleeve, a bracket secured to the last mentioned sleeve, a spring pressed bolt extending through said sleeve and arranged to engage any one of the holes in the first mentioned sleeve, means to rotate the revoluble sleeve comprising a collar revolubly mounted thereon, a spring pressed bolt mounted in said collar and arranged to engage a plurality of apertures in the sleeve, an operating handle, and means to detachably secure the handle to the said collar, a U-shaped member secured to the post and having a roller thereon, and means on the said revoluble sleeve to secure a wire thereto after the same has passed over said roller.

In testimony whereof, I affix my signature, in the presence of two witnesses.

THOMAS J. BLOSICK.

Witnesses:
A. R. ALTERMATT,
W. A. RIES.

Copies of this patent may be obtained for five cents each, by addressing the "Commissioner of Patents, Washington, D. C."